United States Patent [19]
Yarom

[11] Patent Number: 5,956,710
[45] Date of Patent: Sep. 21, 1999

[54] APPARATUS FOR AND METHOD OF PROVIDING USER EXITS ON AN OPERATING SYSTEM PLATFORM

[75] Inventor: Yuval Yarom, Tel Aviv, Israel

[73] Assignee: Memco Software, Ltd., Tel Aviv, Israel

[21] Appl. No.: 09/120,226

[22] Filed: Jul. 22, 1998

Related U.S. Application Data

[62] Division of application No. 08/538,537, Oct. 3, 1995.

[51] Int. Cl.$^6$ .................................................. G06F 17/30
[52] U.S. Cl. ................................ 707/3; 707/104; 707/1; 707/2
[58] Field of Search ............................ 707/1, 2, 3, 104; 395/168, 568, 500; 34/494

[56] References Cited

U.S. PATENT DOCUMENTS

| | | | |
|---|---|---|---|
| 4,621,321 | 11/1986 | Boebert et al. | 707/8 |
| 4,881,263 | 11/1989 | Herbison et al. | 380/21 |
| 4,956,769 | 9/1990 | Smith | 707/9 |
| 5,032,979 | 7/1991 | Hecht et al. | 364/222.5 |
| 5,163,147 | 11/1992 | Orita | 707/9 |
| 5,271,007 | 12/1993 | Kurahashi et al. | 370/351 |
| 5,276,901 | 1/1994 | Howell et al. | 707/9 |
| 5,369,770 | 11/1994 | Thomason | 34/494 |
| 5,394,469 | 2/1995 | Nagel et al. | 380/4 |
| 5,421,011 | 5/1995 | Camillone et al. | 395/674 |
| 5,454,086 | 9/1995 | Alpert | 395/568 |
| 5,483,596 | 1/1996 | Rosenow | 380/25 |
| 5,495,606 | 2/1996 | Borden | 707/9 |
| 5,584,022 | 12/1996 | Kikuchi et al. | 707/9 |
| 5,584,023 | 12/1996 | Hsu | 707/204 |
| 5,752,005 | 5/1998 | Jones | 395/500 |
| 5,764,889 | 6/1998 | Ault | 395/168 |

*Primary Examiner*—Thomas G. Black
*Assistant Examiner*—Diane D. Mizrahi
*Attorney, Agent, or Firm*—McDermott, Will & Emery

[57] ABSTRACT

An apparatus for and method of providing user exits, including dynamic installation of associated software, within the kernel portion of an operating system. An initializer replaces existing system call pointers, in the system services table located in the kernel portion of an operating system, with new pointers to user supplied code. System calls that are hooked, when issued by a user application, are intercepted by a kernel level intercepter which generates a query to a database interface. The database interface sends database requests based on the received query to a database engine. A database manager allows a user to add, delete, edit, etc. records in a database included in the database engine. A method of dynamically inserting user supplied code into the kernel space of an operating system is also disclosed. A communications channel is opened and its associated buffer location is found. A bootstrap loader module is then written into the communications channel buffer. The installed bootstrap loader code calls a kernel level memory allocation system call which allocates a memory buffer in kernel memory. User supplied code, for establishing user exits, is written into the kernel memory buffer. Pointers in the system services table are modified to point to the newly allocated kernel memory buffer.

16 Claims, 6 Drawing Sheets

— 1 —

APPARATUS FOR AND METHOD OF PROVIDING USER EXITS ON AN OPERATING SYSTEM PLATFORM

This application is a division of Ser. No. 08/538,537, filed Oct. 3, 1995.

FIELD OF THE INVENTION

The present invention relates to an apparatus for and a method of providing user exits within the kernel portion of an operating system, including dynamic installation of associated software for the implementation thereof.

BACKGROUND OF THE INVENTION

Many operating systems (OS) today do not include a built in mechanism, called user exits, to divert program control from the operating system or related services to user supplied functions. In many programming instances it is desirable to divert or intercept system calls, issued from a user application, and execute user supplied code instead. The code supplied by the user might bypass the entire original system function call or it might perform a function in conjunction with the original system function call. One application of such a system might include a security system whereby operating system calls issued by a user application are not permitted to execute unless the calling process has the requisite authority or privileges. Another application of this system of providing user exits might include a system profiler whereby any or all operating system calls issued by an application are tracked and used to generate statistics about the behavior of the user application. Yet another application of the system is a system used for enhancing operating system services where it is not desired to permanently modify the internal kernel functions built into the operating system.

User exit are used extensively on mainframe computer. They provide a mechanism to allow a system routine to be executed when a running program arrives at certain points. The system routine, however, might contain code supplied by the user for performing a particular function. For example, user supplied system code might function to determine whether a process should be granted or denied permission to use certain system services or resources. The security example presented above is similar in that user exits are employed to deny or allow user applications access to system services such as communications channels, access to devices or other system resources.

Implicit in the concept of providing user exits on an operating system platform, is that the supplied user exit code itself is able to be inserted and installed within the operating system where it can be accessed. Some operating systems provide the capability of inserting user supplied code into kernel space. Kernel space refers to the area of memory that contains the core operating system software including associated system calls and various data structures needed to manage and operate the computer platform on which the operating system is installed. Other operating systems, however, do not provide a capability of inserting user code into kernel space.

SUMMARY OF THE INVENTION

Thus, there is a long felt need to provide a mechanism for providing user exits on an operating system platform in addition to a mechanism for creating and inserting user supplied code to be accessed via these user exits.

It is therefore an object of the present invention to provide an apparatus for and a method of establishing user exits within the kernel portion of an operating system platform, including the dynamic installation of associated software for the implementation thereof. An initializer replaces existing system call pointers, located in the system services table in the kernel portion of an operating system; with new pointer to user supplied code. System calls that are hooked in this fashion get intercepted, when issued by a user application, by a kernel level interceptor which generates a query to a database interface. The databases interface sends database requests, based on the received query, to a database engine. A database manager allows a user to add, delete, edit, etc. records in a database included in the database engine.

It is also an object of the present invention to provide a method of dynamically inserting user supplied code into the kernel space of an operating system. A communications channel is first opened and a data buffer is written into it. The location of the data buffer is subsequently found. A bootstrap loader module is then written into the communications channel buffer. A free system call entry in the system services table is found and set to point to the communications channel buffer. The bootstrap loader code is then executed. The installed bootstrap loader code calls a kernel level memory allocation system call which allocates a memory buffer in kernel space. User supplied code, for establishing user exits, is written into this kernel memory buffer. Pointers in the system services table are modified to point to the newly allocated kernel memory buffer.

There is also provided, in accordance with a preferred embodiment of the present invention, an apparatus for providing user exits on an operating system platform, which includes an initializer for replacing a plurality of existing system call entries in a system services table with a set of alternate system call entries, and a kernel level intercepter for providing user supplied code to be executed upon issuance of a system call whose associated system services tables entry is found within the set of alternate system call entries.

There is provided in accordance with a preferred embodiment of the present invention, an apparatus for providing system call security on an operating system platform, which includes an initializer for replacing a plurality of existing system call entries with a set of alternate system call entries associated with system calls to be hooked, a kernel level intercepter for receiving a previously hooked system call, issued from a calling process, and for generating an associated database query and receiving a corresponding reply, the kernel level intercepter permitting the previously hooked system call to execute if the reply indicates sufficient privileges, the kernel level intercepter sending a return failure value to the calling process if the reply indicates insufficient privileges, a database interface coupled to the kernel level intercepter, the database interface for receiving the database query, forming at least one database request based an the query and generating a reply to the kernel level interceptor based on a response from a database engine, and the database engine coupled to the database interface, the database engine for receiving the at least one database request, serving as a repository of data and generating the response to the database interface based on the data stored within the repository of data.

Also provided in accordance with a preferred embodiment of the present invention, is a method for providing user exits on an operating system platform, which includes the steps of replacing a plurality of existing system call entries in a system services table with a set of alternate system call entries, and providing user supplied code to be executed upon issuance of a system call whose entry is found within the set of alternate system call entries.

In accordance with a preferred embodiment of the present invention, there is also provided a method of providing system call security on an operating system platform, including the steps of replacing a plurality of existing system call entries with a series of alternate system call entries associated with system calls to be hooked, receiving a previously hooked system call, issued from a calling process, and generating a database query, providing a database interface for receiving and managing the database query and for forming at least one database request based on the database query, providing a database engine for serving as a repository of data and for generating a response to the at least one database request, and generating a reply to the database query, based on the response from database engine, permitting the previously hooked system call to execute if the reply indicates sufficient privileges, sending a return failure value to the calling process if the reply indicates insufficient privileges.

In accordance with yet another preferred embodiment of the present invention, there is provided a method of dynamically inserting user supplied code into the kernel portion of an operating system, which includes the steps of opening and writing data into a communications channel, determining the location of a communications channel buffer associated with the communications channel, writing bootstrap loader code into the communications channel buffer, executing the bootstrap loader code thereby creating a memory buffer within the kernel portion, and inserting the user supplied code into the memory buffer.

In accordance with another a preferred embodiment of the present invention, there is provided a method of dynamically inserting user supplied code into the kernel portion of an operating system, comprising the steps of opening and writing data into a communications channel, determining the location of a communications channel buffer associated with the communications channel, writing bootstrap loader code into the communications channel buffer, replacing a first unused entry in a system services table within the kernel portion with a pointer pointing to the communications channel buffer, calling the bootstrap loader code, by calling the code pointed to by the entry in the system services table, thereby creating a memory buffer within the kernel portion, inserting the user supplied code into the memory buffer; and replacing second unused entry in the system services table within the kernel portion with a pointer pointing to the memory buffer.

In accordance with a preferred embodiment of the present invention, the database interface includes a queue manager coupled to a request queue, the queue manager for receiving the database query and for placing the database request on the request queue.

In accordance with another preferred embodiment of the present invention, the database engine includes a database server coupled to a database, the database server for querying the database and generating the response to the database request.

In accordance with yet another preferred embodiment of the present invention, the apparatus of providing user exits also includes database manager coupled to the database interface, the database manager for creating and/or maintaining the repository of data within the database engine.

In accordance with still another preferred embodiment of the present invention, the step of replacing includes the steps of building a transformation table containing the alternate system call entries, and for each existing system call entry to be replaced, replacing the existing system call entry with the alternate system call entry from the transformation table.

In accordance with yet another preferred embodiment of the present invention, each step of determining includes the steps of searching a user area of a kernel portion of the operating system platform to find a location for a process structure associated with the calling process, examining the process structure to find a location for an open file table associated with the calling process, examining the open file table to find a location for a global open file table associated with the system, examining the global open file table to find a location for a socket structure associated with the calling process, and determining the location of the communications channel buffer from an examination of the socket structure.

BRIEF DESCRIPTION OF THE DRAWINGS

The invention is herein described, by way of example only, with reference to the accompanying drawings, wherein.

DETAILED DESCRIPTION OF THE INVENTION

The present invention provides an apparatus for and a method of providing user exits, including the dynamic installation of associated software, within the kernel portion of an operating system.

The principles and operation of the present invention may be better understood with reference to the drawings and the accompanying description.

Figure 1:
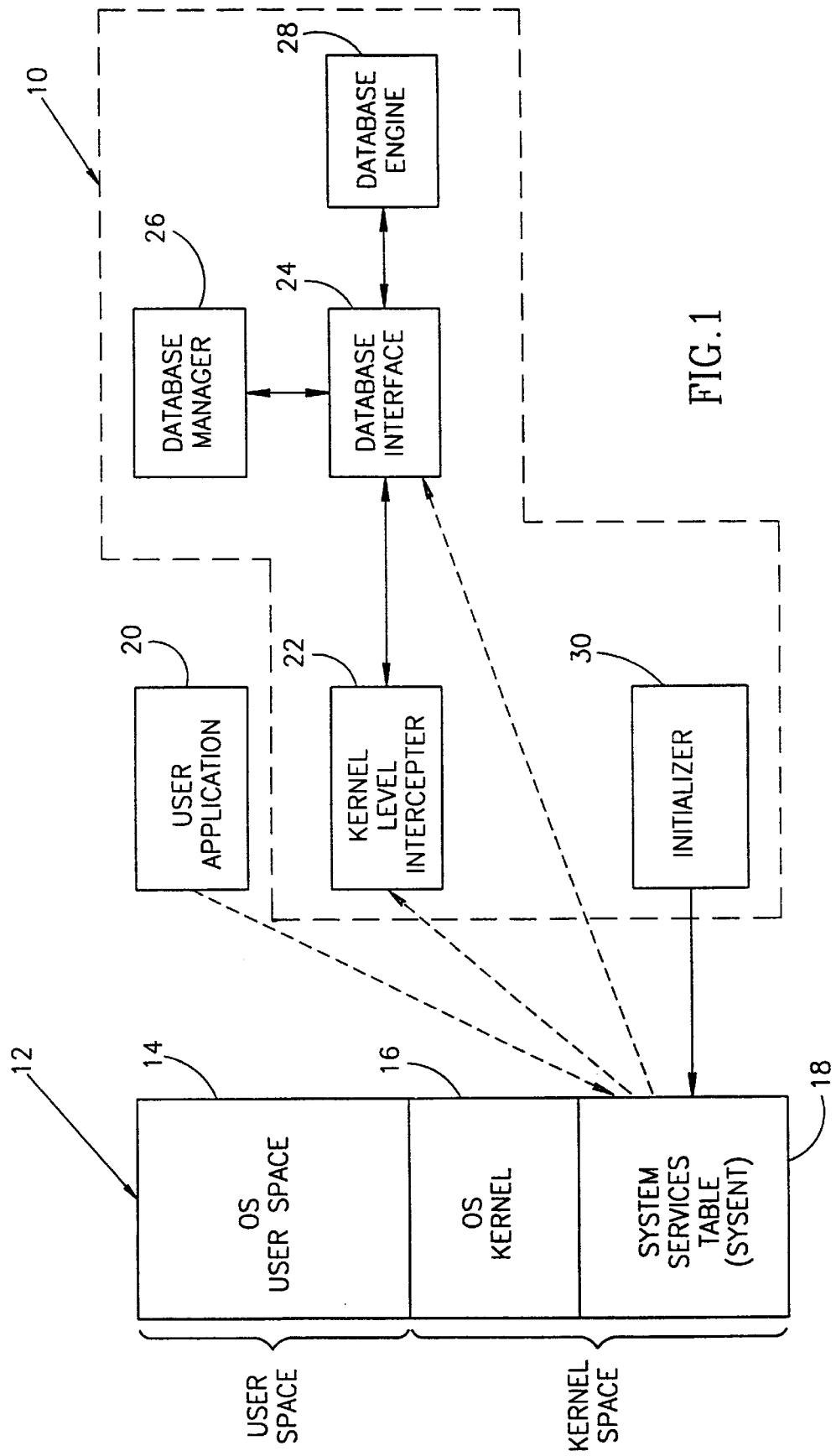
FIG. 1 is a high level block diagram of a preferred embodiment of the present invention.

The present invention provides the capability of installing and utilizing user exits on operating system platforms that do not have this capability built in. A high level block diagram of a device 10, embodying the present invention, is illustrated in FIG. 1. A kernel level intercepter 22 is shown coupled to a database interface 24. Database interface 24 is coupled to a database engine 28. A database manager 26 is coupled to database interface 24. A user application 20 is shown with a dotted line connection to a system services table 18. System services table is a special area of memory in operating system 12 memory, called sysent (system entries) on most UNIX type operating systems. An initializer 30 modifies system services table 18. Also illustrated is the user space 14 portion of operating system 12 which holds user application code and user data. The kernel space portion of OS 12 includes a kernel 16 and system services table 18.

A description of the operation of device 10 follows. First, it is determined which operating system calls are to be intercepted. For each system call to be intercepted, the corresponding pointer in system service table 18 is replaced with a pointer to the replacement or user provided function call. Initializer 30 performs this function once when the software associated with device 10 is first launched or executed.

Once the system call pointers in system service table 18 have been replaced for all system calls to be intercepted, subsequent calls to these system functions will be intercepted by the user provided code. When user application 20, executing in operating system user space 14, issues a system call whose pointer has previously been replaced, control passes either to kernel level intercepter 22 or database interface 24, depending on which system call was originally issued by user application 20. The flow of program control is depicted in FIG. 1 by the dotted arrows between user application 20 and system services table 18 and between system service table 18 and kernel level intercepter 22 and database interface 24.

Kernel level intercepter 22 receives redirected or intercepted system calls from user application 20 and forms a query to be sent to database interface 24. The query may consist of any information pertinent to the application device 10 is being put to. For example, in a preferred embodiment, deice 10 functions as a security system whereby for each system call issued by user application 20, adequate privileges of user application 20 to execute the issued system call is first verified. If user application 20 has the necessary authority or privileges, execution of the system call is permitted. If user application 20 does not have the necessary authority, then a return failure value is returned to user application 20.

Device 10, however, has applications in areas other than security. For example, a system profiler can be implemented by intercepting each system call and tracking execution details associated with user application 20. Such particulars as the number of time each system function is called, the length of time spent in each function, etc. can be tracked. This information is typically useful for software system developers during the development and debugging phases of software projects.

Another application of device 10 is in a system meant to enhance system services where it is not desirable or even possible to insert code into kernel 16. Many operating systems do not allow access to the kernel portion of memory. In other instances system functions supplied by the operating system might not be adequate enough, in an area, for example, such as encryption. Additional functionality, provided by the user, can be added to the existing functionality already incorporated in the operating system. This added functionality can be obtained by intercepting the appropriate system calls and executing the user provided additional code. The original system call provided by the operating system can be bypassed altogether, executed before or executed after the user provided code.

Figure 2:
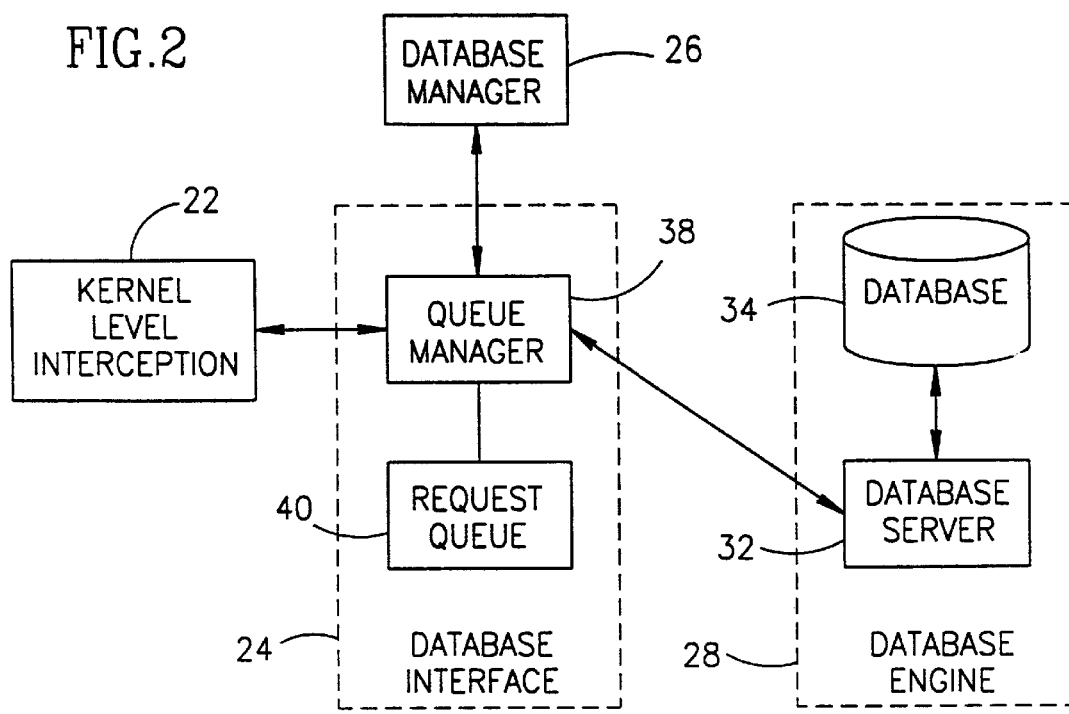
FIG. 2 is a detailed block diagram illustrating the database interface and database engine portion of a preferred embodiment of the present invention.

A detailed block diagram of database interface 24 and database engine 28 is illustrated in FIG. 2. Database interface 24 includes a queue manager 38 coupled to kernel level intercepter 22 and a request queue 40. A manager 26 is also coupled to queue manager 38. Database engine 28 includes a database server 32 coupled to a database 34. Queue manger 38 communicates with database server 32.

Queue manager 38 receives queries from kernel level intercepter 22 and processes them in accordance with the contents of the query. For each query received from kernel level intercepter 22, queue manager 38 forms one or more database requests. The database requests are placed onto request queue 40 where they await forwarding to database engine 28. Each request is uniquely identified with a request identification number. This allows replies from database engine 28 to be matched with corresponding requests issued by database interface 24.

Database interface 24, in addition to kernel level intercepter 22 and initializer 30 all operate in kernel portion 16 of operating system 12.

Database requests are sent from queue manager 38 and received by database server 32. Database server 32 provides the physical interface into database 34. It performs the actual query into the database and reads data from and writes data to database 34. Database 34 holds data necessary to carry out the application device 10 is applied to. For example, in a security application, database 34 would hold user information such as user identifications, privileges, access rights, etc. that are necessary in making the determination of whether a user application has sufficient authority or privileges to execute a particular system calls.

Database manager 26 functions to create and maintain database 34. Database 34 can, initially, either be created locally or it can be imported from a system external to device 10. In either case, additions, deletions and changes to records in database 34 may be performed using database manager 26.

Database server 32 returns a reply for each request received from queue manager 38. Upon receipt of all replies corresponding to the original received query, queue manager 38 forms a reply to the query and sends the reply to kernel level intercepter 22. Kernel level intercepter 22 subsequently grants or denies access to the issued system call based on the reply received from database interface 24.

For some system calls, permission is immediately granted and the issued system call executed, before a query is sent to database interface 24. In a security application, for example, during the creation of a new process by user application 20, database 34 needs to be checked for information purposes only and not for verifying privileges or authority. In this case, only information as to whether or not the new process has previously been registered by or is known to device 10 is required. In addition, in certain situations, such as with communications, it might be desirable to allow some system calls to issue before verification is performed. For instance, user application 20 might seek to accept a communication request from a remote location external to the machine embodying device 10. In this case, permission is immediately granted to execute the related system calls. This is to allow the system call to finish executing so that pertinent information can be written into the kernel. Immediately thereafter, the user application's privileges to issue these system calls are verified. If user application 20 has sufficient privileges the communication link is allowed to proceed. If user application 20 lacks sufficient privileges the communication link is cut and a return failure value is returned to user application 20.

Figure 3:
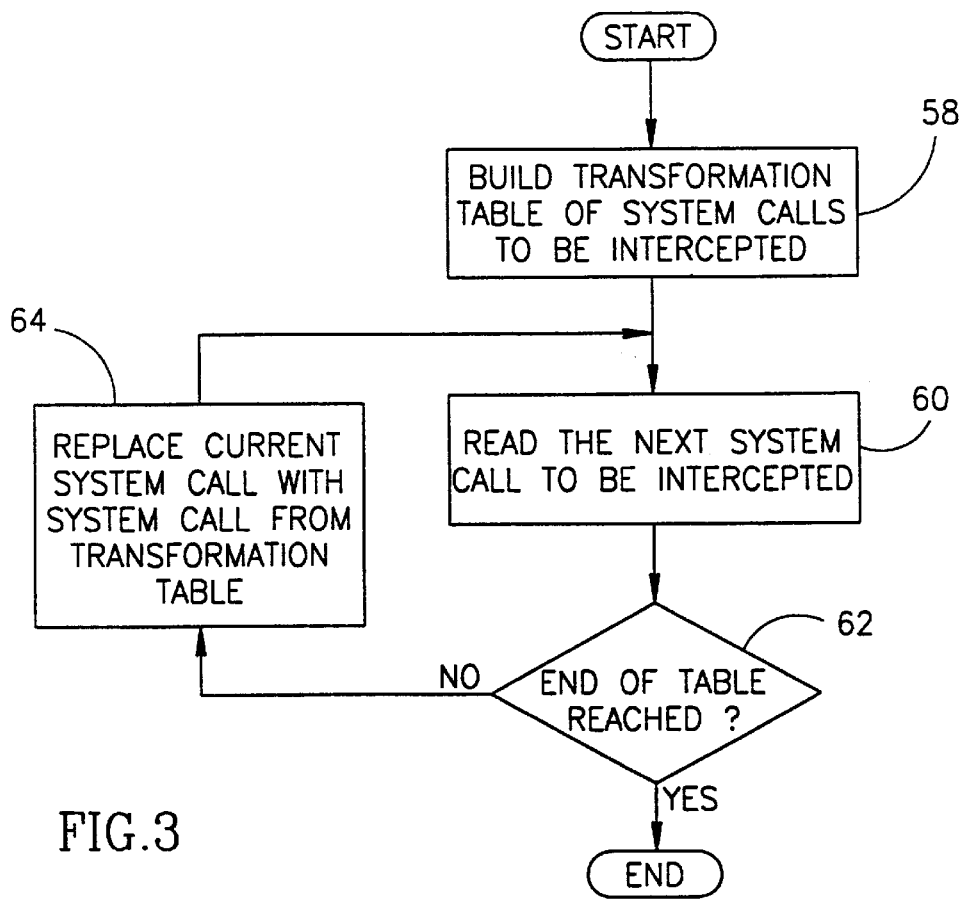
FIG. 3 is a high level flow diagram illustrating the method of installing alternate system calls into the kernel space of an operating system.

A high level block diagram of the method of replacing the system call entries in system service table 18 is illustrated in FIG. 3. First, a transformation table of system calls to be intercepted is constructed (box 58). Each entry includes the system call to be intercepted and a pointer pointing to user code to be executed when the corresponding system call is issued. For each entry in the transformation table, the next system call and its new corresponding pointer is read from the transformation table (box 60). If the end of the transformation table has not been reached (decision box 62) the existing or current system call in system services table 18 is replaced with the new system call from the transformation table (box 64). In actuality, the system function code is not replaced but only pointers to the functions are replaced. Initializer 30 performs this method once, upon startup of device 10.

Figure 4:
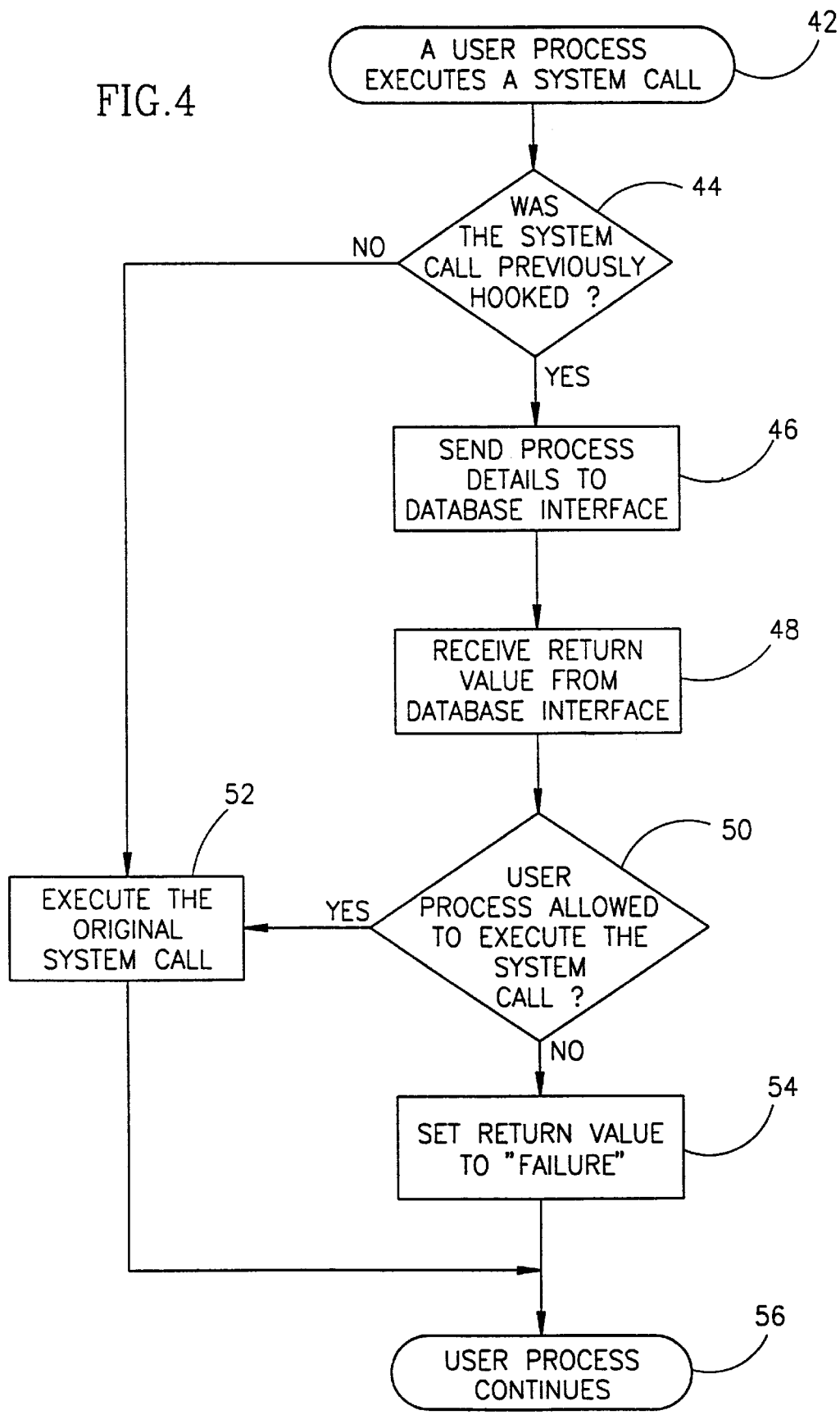
FIG. 4 is a high level flow diagram illustrating the method of intercepting an issued system call.

A method of intercepting an issued system call is illustrated in FIG. 4. The process starts when user application 20 issues a system call (rounded box 42). First, it is determined whether the system call was previously hooked (decision box 44). Hooking is the technique of replacing original system call pointers with pointers to user supplied code. When a hooked system call is issued, control passes to the user supplied code, rather than the original system function supplied by operating system 12. If the system call was not previously hooked, the original system call is executed and the user process continues. If, however, the system call was previously hooked, a query is formed and sent to database interface 24 (box 46). The query, for a security application, would typically include process details such as the process identification of the calling process and some or all of the associated system arguments to the called function. In addition, some of the arguments from the original system call might be replaced with other data. For example, references to data structures might be replaced with the actual data within the data structure. Certain details about the calling process might be added, such as, what application is currently running, etc. Generally, the query includes any and all data necessary to accomplish the application device 10 is put to. In the case of a security application, the query would include all data necessary to make the determination of whether user application 20 has sufficient privileges to execute the issued system call.

A reply to the query is subsequently received by kernel level intercepter 22 from database interface 24. It is then determined if the user process has sufficient privileges to execute the system call (decision box 50). If the user process lacks sufficient privileges, a failure value is returned to the calling process (box 54) and the user process continues (rounded box 56).

Before device 10 can begin intercepting system calls issued by user application 20, the code for kernel level intercepter 22, database interface 24 and initializer 30 must be placed in kernel space within operating system 12. In other words, code for the user exits must be installed before any system calls can be intercepted. Some operating systems include the ability to load code modules into kernel space. Some operating systems, however, do not provide a built in mechanism to load code modules into kernel space. Accordingly, a preferred embodiment of the present invention discloses a method of dynamically inserting user supplied code into the kernel space of an operating system. The method is dynamic in that the code is inserted while the operating system is executing rather then being loaded statically, such as before the operating system is read into memory.

In general, a bootstrap loader code module in inserted into a small area of kernel memory space. This bootstrap loader code subsequently allocates sufficient kernel buffer memory space to hold the user supplied code. Subsequently, the user supplied code is copied into the allocated buffer and pointers within system services table 18 are modified accordingly to point to the newly installed user code.

Figure 5:
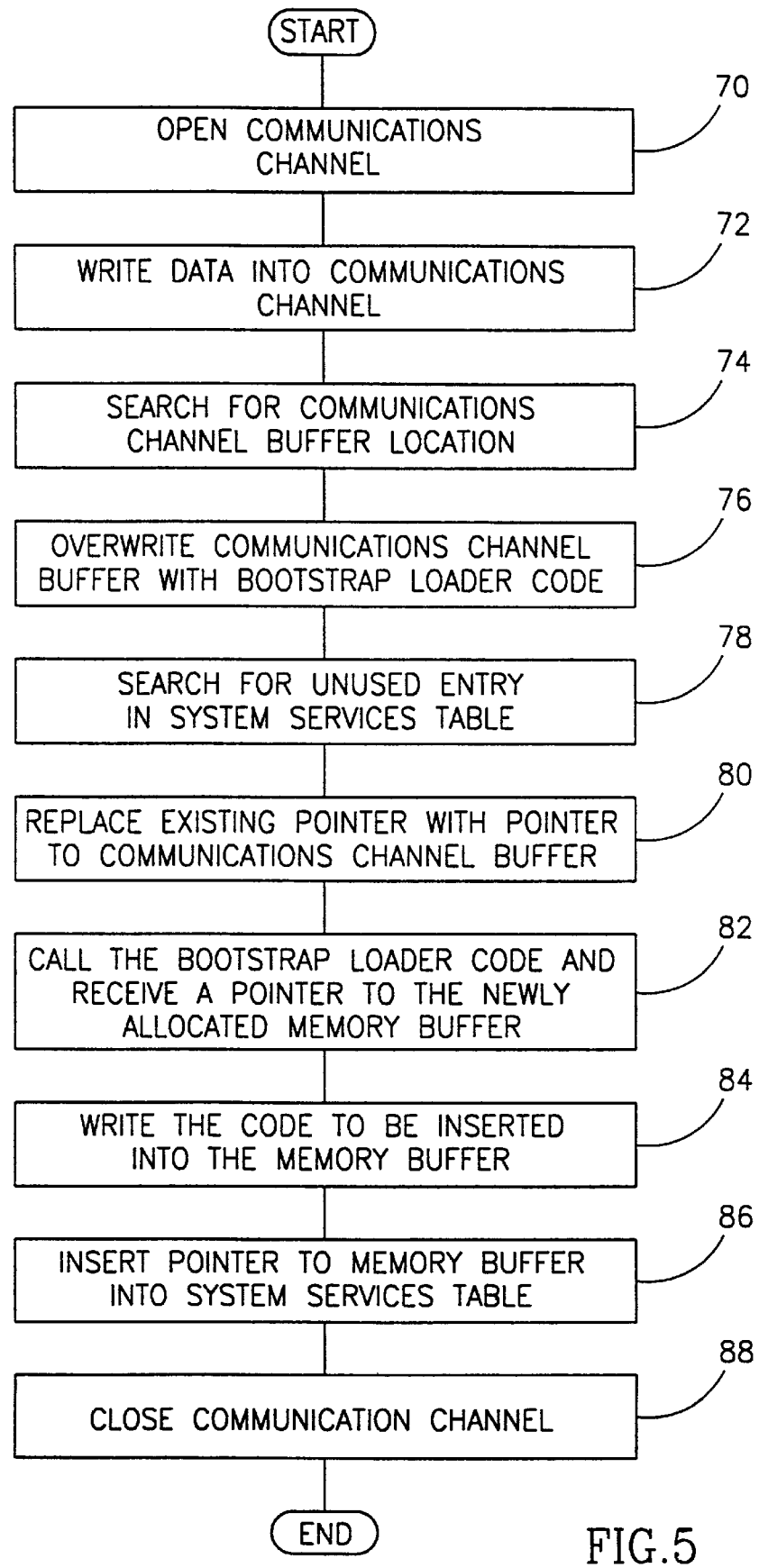
FIG. 5 is a high level flow diagram illustrating the method of inserting user code into the kernel portion of an operating system.

A high level flow diagram of the method of installing user exits is illustrated in FIG. 5. First, a communications channel is opened from the calling user process to itself (box 70). A sufficiently large amount of data, between approximately 50 to 4,000 bytes, is then written into the communications channel in the kernel (box 72). The location of the communications channel buffer created in box 70 is then determined by tracing pointers within the kernel memory 16. Access to kernel memory 16 is via 'dev/kmem' which is a pseudo device containing an image of kernel memory. This pseudo device can be opened and written to as routinely done with other devices. The process of searching and locating the communications channel buffer location is described in more detail below.

Once the communications channel buffer location has been found, the data previously written into it is overwritten with the bootstrap loader code (box 76). The bootstrap loader code calls kernel memory allocation services (i.e. malloc, kernel_alloc, kmalloc or kmem_alloc, depending on the particular operating system being used). Once the bootstrap loader code has been written, an unused system call entry is found in system services table 18 (box 78). The pointer of the unused entry is replaced with a pointer to the communications channel buffer location found in box 74 (box 80). This accomplishes the hooking of the bootstrap loader code within kernel memory 16.

The system call associated with the newly replaced pointer to the communications channel buffer is called using the 'syscall' library function (box 82). On most UNIX type operating systems 'syscall' allows a program to call a system routine referencing a number or pointer rather than by referencing its system call name. The operating system returns a pointer to the newly allocated memory block or buffer created in kernel 16. Once the memory block has been allocated, the code to be inserted into kernel space is written to kernel 16 via '/dev/kmem' (box 84). The kernel pointer in system services table 18 is modified to refer to the newly allocated memory block containing the user code (box 86). The communications channel is subsequently closed (box 88).

Once the user supplied code is in place and hooked, it can be called as any other system call. The initializer 30 is called first to install and/or establish hooking to other user supplied code modules, for establishing one or more user exits, within kernel space.

Figure 6:
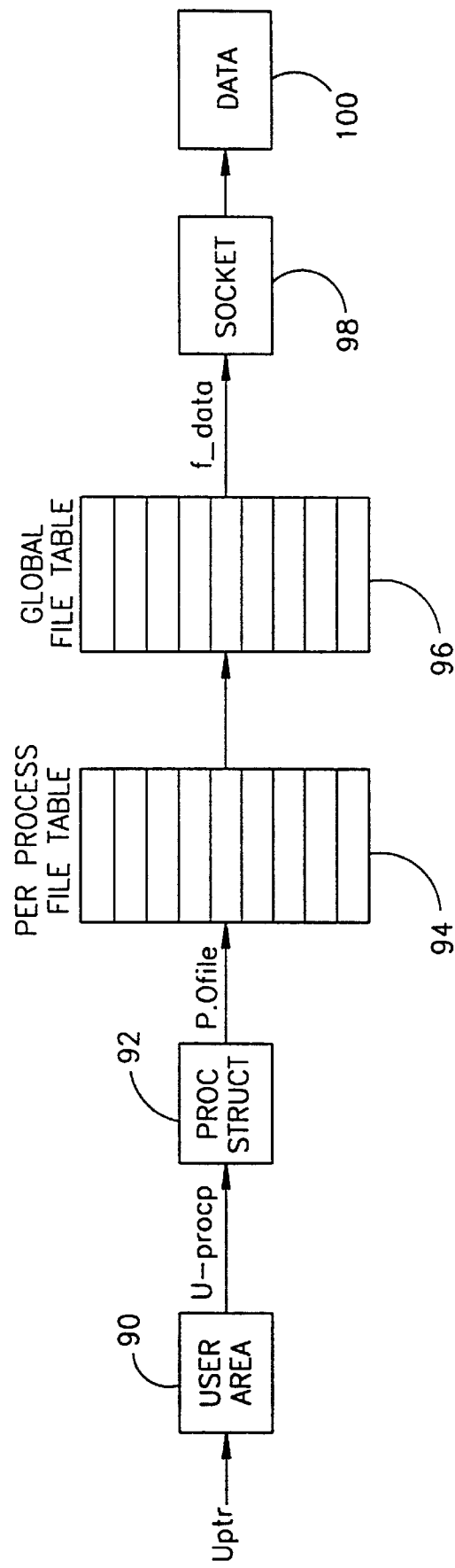
FIG. 6 is a high level block diagram illustrating the search path for locating a communications channel buffer.

An illustration of the search technique used in a preferred embodiment of the present invention to find the location of the communications channel buffer opened in box 70 (FIG. 5) is shown in FIG. 6. The structures tracked during the search for the communications channel buffer are user area 90, analogous to user space 14, and structure or proc struct 92. Both user area 90 and proc struct 92 are well known UNIX type operating system entities. Proc struct 92 is reached from user area 90 by the 'u_proc' pointer. User area 90 is reached from proc struct 92 by using the 'p_user' field of proc struct 92. From those entities the search continues to an open file table of the calling process 94 and then to a global open file table 96 associated with operating system 12. Open file table 94 will be pointed to from proc struct 92 or user area 90. Open file table 94 may be implemented using an array, linked list, linked list of arrays or array of arrays. On Hewlett Packard platforms, a pointer from proc struct 92 points to an array of arrays. Each element in the array points to an array of identifiers of open files (i.e. 'ofile_t'). From global open file table 96 the search continues to a structure of the socket 98 (i.e. the communication channel). Ultimately, the data or communication channel buffer location 100 is found from socket 98.

In an alternative embodiment of the present invention, directed toward a computer platform manufactured by American Telephone & Telegraph, Inc., New York, N.Y., instead of using socket structure 98, a 'vnodes' table is used instead. From the vnodes table the search continues to a stream and finally to the queue of that stream.

In another alternative embodiment of the present invention, directed toward computer platforms manufactured by Hewlett Packard, Inc., user area 90 is found by using a global variable of the kernel called 'uptr' which points to the user area. On other computer platforms the user area is found from a static location called 'u.' On some other computer platforms the user area is part of the proc struct or is pointed to by the proc struct. On these platforms, the proc struct should be located first. There are several ways to find the proc struct. If a variable called 'curproc' is accessible, it will point to the proc struct, otherwise, the entire process list can be scanned using the 'p_link' field to switch from one process to the next, until the calling process is reached.

Figure 7:
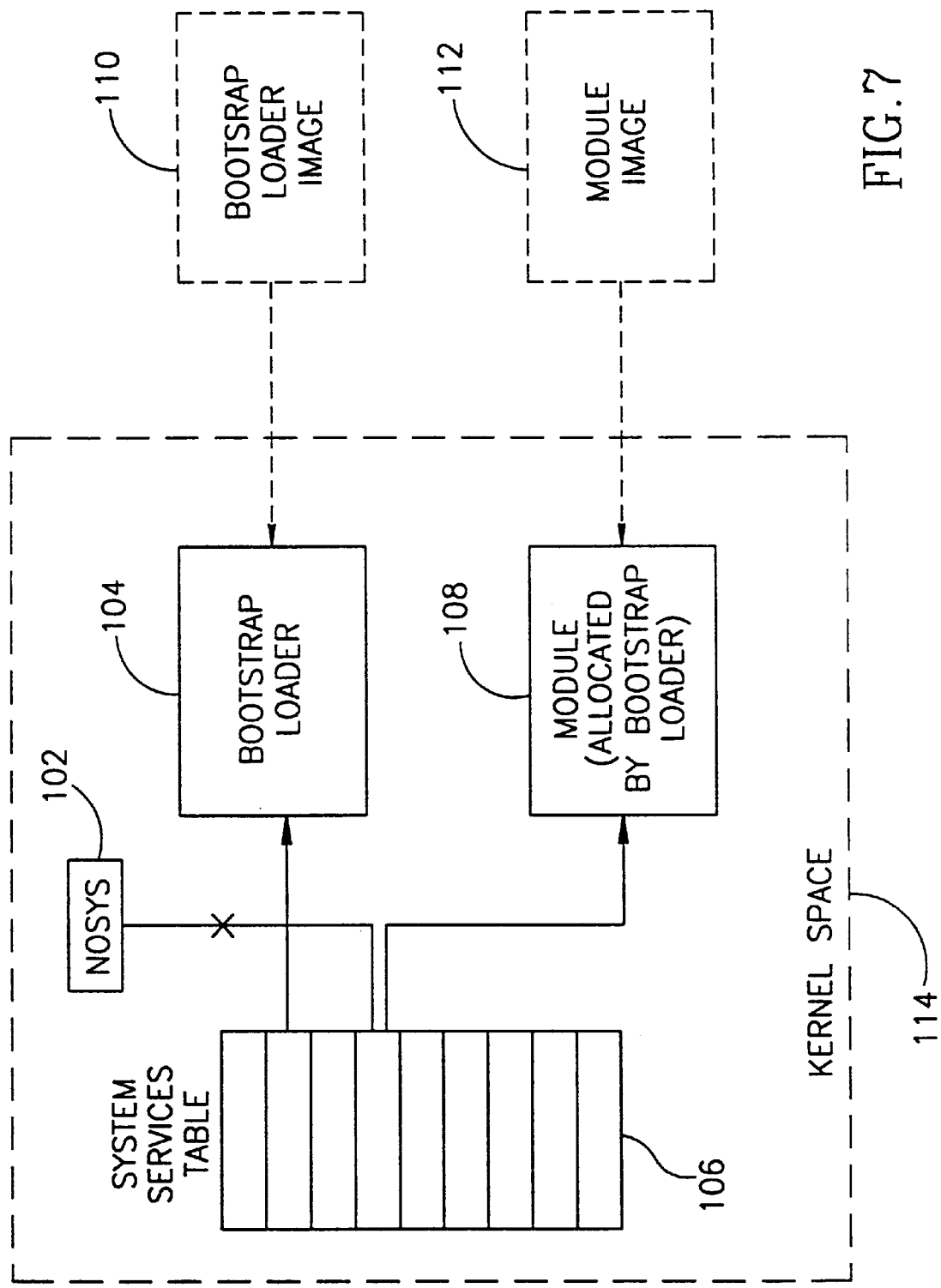
FIG. 7 is a high level block diagram illustrating a view of the kernel space during the insertion of user code.

An illustration of kernel space 114 during the process of dynamically inserting user code into the kernel of an operating system is shown in FIG. 7. A bootstrap loader image 110 contains the bootstrap loader code inserted in box 76 (FIG. 5). A module image 112 contains the user supplied code to be inserted into kernel space 114 as performed in box 84 (FIG. 5). Both images are typically stored in a permanent media such a hard disk drive or other suitable storage means. Bootstrap loader image 110 is copied from the storage means into kernel space 114 to create bootstrap loader 104. More specifically, bootstrap loader image 110 is copied into the communications channel buffer created in box 70 (FIG. 5). After bootstrap loader 104 executes, allocating a memory buffer, module image 112 is copied into kernel space 114 to create user code module 108. An existing pointer to NOSYS in system services table 106 is modified to point to module 108.

While the invention has been described with respect to a limited number of embodiments, it will be appreciated that many variations, modifications and other applications of the invention may be made.

What is claimed is:

1. An apparatus for providing user exits on an operating system platform, comprising:
    an initializer for replacing a plurality of existing system call entries in a system services table with a set of alternate system call entries; and
    a kernel level intercepter for providing user supplied code to be executed upon issuance of a system call whose associated system services tables entry is found within said set of alternate system call entries.

2. The apparatus of claim 1, further comprising a database interface coupled to said kernel level intercepter, said database interface for providing an interface to a database engine coupled thereto.

3. The apparatus of claim 2, wherein said database engine includes a repository of data accessible by said user supplied code.

4. The apparatus of claim 3, further comprising a database manager coupled to said database interface, said database manager for creating and/or maintaining said repository of data within said database engine.

5. An apparatus for providing system call security on an operating system platform, comprising:
    an initializer for replacing a plurality of existing system call entries with a set of alternate system call entries associated with system calls to be hooked;
    a kernel level intercepter for receiving a previously hooked system call, issued from a calling process, and for generating an associated database query and receiving a corresponding reply, said kernel level intercepter permitting said previously hooked system call to execute if said reply indicates sufficient privileges, said kernel level intercepter sending a return failure value to said calling process if said reply indicates insufficient privileges;
    a database interface coupled to said kernel level intercepter, said database interface for receiving said database query, forming at least one database request based on said query and generating a reply to said kernel level intercepter based on a response from a database engine; and
    said database engine coupled to said database interface, said database engine for receiving said at least one database request, serving as a repository of data and generating said response to said database interface based on the data stored within said repository of data.

6. The apparatus of claim 5, wherein said database interface includes a queue manager coupled to a request queue, said queue manager for receiving said database query and for placing said database request on said request queue.

7. The apparatus of claim 5, wherein said database engine includes a database server coupled to a database, said database server for querying said database and generating said response to said database request.

8. The apparatus of claim 5, further comprising a database manager coupled to said database interface, said database manager for creating and/or maintaining said repository of data within said database engine.

9. A method for providing user exits on an operating system platform, comprising the steps of:
    replacing a plurality of existing system call entries in a system services table with a set of alternate system call entries; and
    providing user supplied code to be executed upon issuance of a system call whose entry is found within said set of alternate system call entries.

10. The method of claim 9, further comprising the step of providing a database interface to a database engine coupled thereto.

11. The method of claim 10, further comprising the step of providing a database manager coupled to said database interface, said database manager for creating and/or maintaining a repository of data stored within said database engine.

12. The method of claim 9 wherein said step of replacing includes the steps of:
    building a transformation table containing an alternate system call entries; and
    for each said existing system call entry to be replaced, replacing said existing system call entry with said alternate system call entry from said transformation table.

13. A method of dynamically inserting user supplied code into the kernel portion of an operating system, comprising the steps of:
    opening and writing data into a communications channel;
    determining the location of a communications channel buffer associated with said communications channel;
    writing bootstrap loader code into said communications channel buffer;
    executing said bootstrap loader code thereby creating a memory buffer within said kernel portion; and
    inserting said user supplied code into said memory buffer.

14. The method of claim 13, wherein said step of determining includes the steps of:

searching a user area of a kernel portion of said operating system platform to find a location for a process structure associated with said calling process;

examining said process structure to find a location for an open file table associated with said calling process;

examining said open file table to find a location for a global open file table associated with said operating system;

examining said global open file table to find a location for a socket structure associated with said calling process; and determining said location of said communications channel buffer from an examination of said socket structure.

15. A method of dynamically inserting user supplied code into the kernel portion of an operating system, comprising the steps of:

opening and writing data into a communications channel;

determining the location of a communications channel buffer associated with said communications channel;

writing bootstrap loader code into said communications channel buffer;

replacing a first unused entry in a system services table within said kernel portion with a pointer pointing to said communications channel buffer;

calling said bootstrap loader code thereby creating a memory buffer within said kernel portion;

inserting said user supplied code into said memory buffer; and replacing a second unused entry in said system services table within said kernel portion with a pointer pointing to said memory buffer.

16. The method of claim 15, wherein said step of determining includes the steps of:

searching a user area of a kernel portion of said operating system platform to find a location for a process structure associated with said calling process;

examining said process structure to find a location for an open file table associated with said calling process;

examining said open file table to find a location for a global open file table associated with said operating system;

examining said global open file table to find a location for a socket structure associated with said calling process; and determining said location of said communications channel buffer from an examination of said socket structure.

* * * * *